Figure 3:
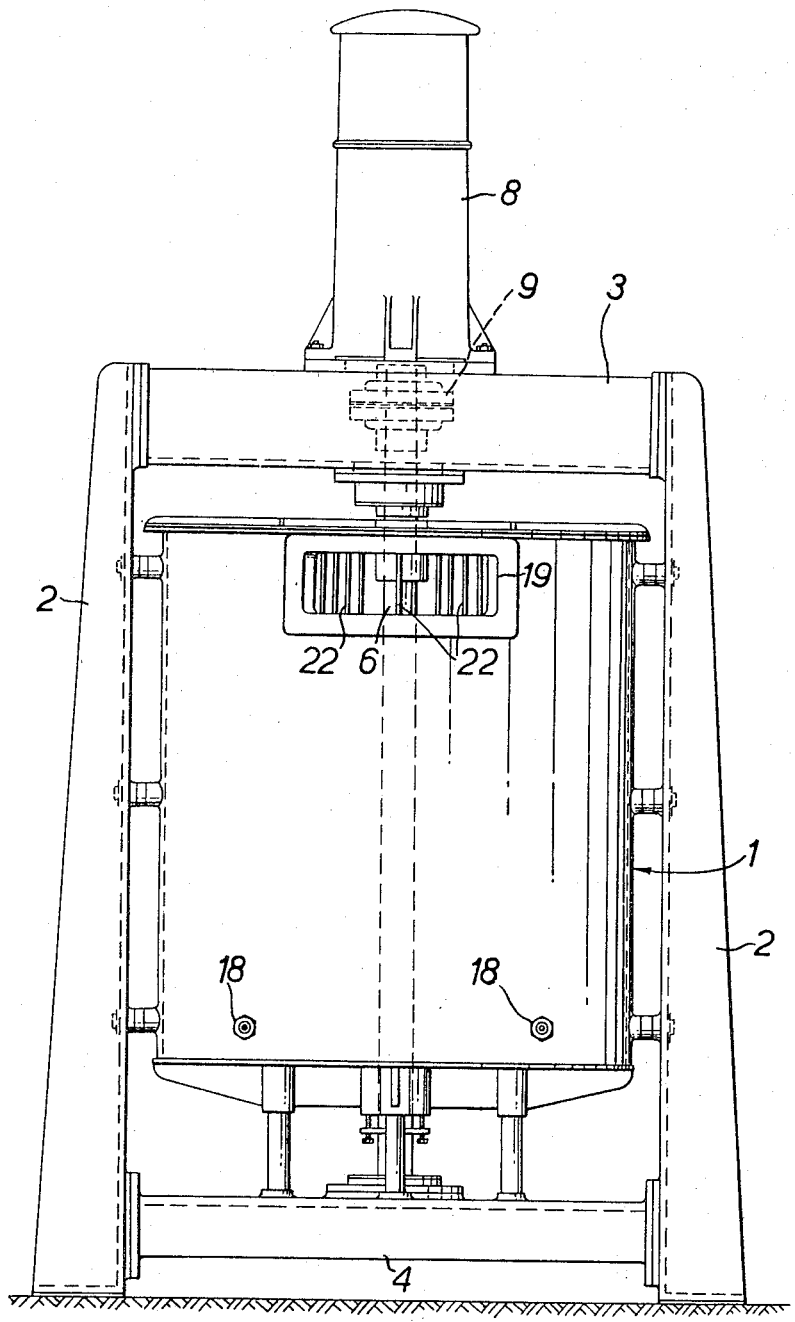

Jan. 3, 1967　　　J. H. BENDLE　　　3,295,834
APPARATUS FOR WHIPPING AND FOAMING MATERIALS
Filed Nov. 27, 1964　　　　　　　　　　　3 Sheets-Sheet 1
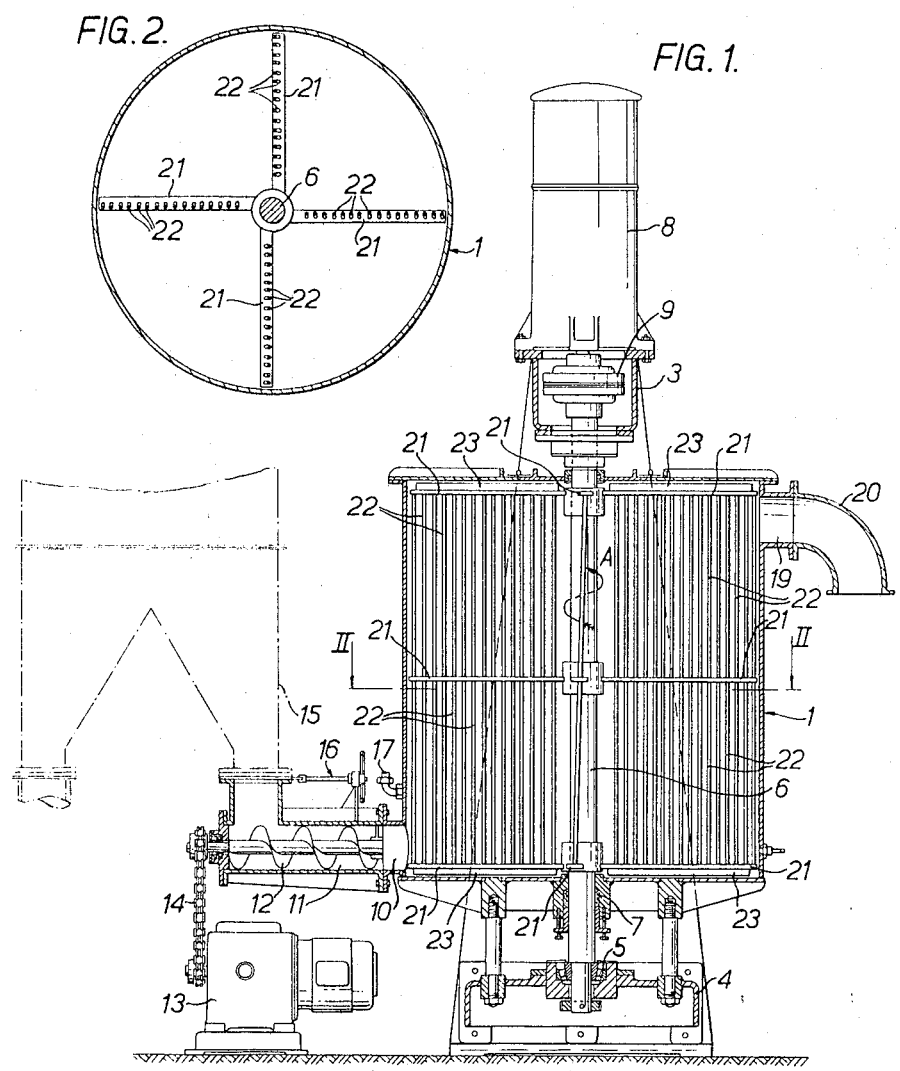
INVENTOR
JOHN HUXTABLE BENDLE
BY
Bacon & Thomas
ATTORNEYS INVENTOR
JOHN HUXTABLE BENDLE
BY
Bacon & Thomas
ATTORNEYS Jan. 3, 1967   J. H. BENDLE   3,295,834
APPARATUS FOR WHIPPING AND FOAMING MATERIALS
Filed Nov. 27, 1964   3 Sheets-Sheet 3

INVENTOR
JOHN HUXTABLE BENDLE
BY
*Bacon & Thomas*
ATTORNEYS

3,295,834
APPARATUS FOR WHIPPING AND FOAMING MATERIALS

John Huxtable Bendle, West Hartlepool, England, assignor to Cerebos Foods Limited, London, England, a British company
Filed Nov. 27, 1964, Ser. No. 414,288
Claims priority, application Great Britain, Nov. 28, 1963, 47,076/63
7 Claims. (Cl. 259—7)

This invention relates to a whipping apparatus, that is an apparatus for use in converting liquid materials, or mixtures or solutions made from liquid material and powdery or granular solids, into a foam. Such a conversion has to be carried out in many manufacturing processes, especially in the manufacture of foodstuffs, such as meringue, and certain types of chemicals. A particular application of the invention is in the manufacture of low density particulate solids; especially common salt by the method described in patent application No. 233,430, now Patent No. 3,196,024 (J. Saunders), which inter alia comprises the formation of a foam carrying the particulate solid the foam being dried and sub-divided into particles.

Thus, viewed from one aspect, the invention provides a method of whipping a material into a foam, comprising introducing such material substantially continuously into a container at or near the bottom thereof, whipping the material within the container by rotary means therein which cuts through the material without imparting any substantial rotary motion thereto, whereby to cause the material to rise within the container, and removing the foamed material at or near the top of the container.

Where the material to be whipped is already in a whippable form, i.e. if it is a liquid, which term is intended to include a pure or mixed liquid or a solution, or if it is a mixture of a liquid with a powdery or granular solid which may or may not form at least a partial solution during the operation, such material may be introduced into the container alone. On the other hand, two or more constituents of the material to be whipped may be introduced separately into the container, such as a liquid solution or mixture and a foaming agent, or a powdery or granular solid and a liquid such as water. Air may also be introduced into the container if this is necessary to assist foaming, and may be pre-mixed with the liquid or solid or introduced separately therefrom.

Preferably, and in accordance with a further feature of the invention, the whipping step is such as to impart a positive lift to the material in the container, e.g. by suitable formation of the whipping means.

Viewed from another aspect the invention provides apparatus for carrying out the method referred to above, comprising a container having an inlet at or near its bottom for the introduction of material to be whipped, an outlet at or near its top for the egress of foamed material, and rotary whipping means mounted within the container for rotation about an axis substantially parallel to the intended direction of movement of the material from the bottom to the top of the container, said whipping means being such as to cut through the material without imparting any substantial rotary motion thereto.

Some materials to be whipped, such as comparatively thick mixtures of liquid and solid, may be of such a nature that if they are not acted upon by the whipping means for a period of time after their introduction into the container, they will cake on its interior walls.

Preferably therefore, and in accordance with a further feature of the invention, the said whipping means is adapted, in operation, to sweep out a volume corresponding to substantially the whole interior of the container. If desired the whipping means may carry scrapers arranged to clear at least the top and bottom interior walls of the container during operation.

Where the rotary whipping means is intended to sweep out substantially the whole volume of the container the latter will be of upright cylindrical shape, the whipping means being mounted for rotation about the axis of the container. The whipping means may then comprise at least one whipping device extending radially of the container from its axis nearly to the container wall; in a preferred form of the invention four such whipping devices are provided, arranged at 90° to one another in the form of a cross when viewed in plan.

The whipping means will, as mentioned above, be formed so as to cut through the material to be whipped rather than to impart any substantial rotary motion to the material and will therefore have a whipping surface whose area is small compared with the total area which it spans. Thus each whipping device will be of lattice or open-work construction; in a preferred form of the invention each whipping device is formed by a number of elongate members such as metal bars or rails. Preferably the whipping bars or rails are arranged in parallelism with one another.

Although some materials to be whipped are such that, during whipping, they will rise in the container without any artificial inducement as a result of their foaming and the continual introduction of further material at or near the bottom of the container, comparatively thick materials such as liquid and solid mixtures may require some added inducement to cause them to rise. Preferably therefore, and in accordance with a further feature of the invention, at least part of the said whipping means is so arranged as, during its rotation, to urge the material upwardly in the container. Such an effect may most conveniently be attained by arranging at least part of the or each whipping device an angle to a plane containing the axis of rotation of the whipping means. The degree of cant of the or each whipping device may, of course, be chosen depending on the operational characteristics which may be desired of the apparatus and may vary between a very small amount, such as one degree of arc, and a pronounced helical configuration. In some forms of the invention the whole of the or each whipping device may be so canted, but in others only the lower part thereof may be canted so as to impart an initial lift to the material before its density decreases as a result of foaming.

Where, as in the manufacture of low-density salt, the material to be whipped consists of a mixture of partial solution including liquid and a granular material, the container may be provided with two or more inlets for the respective constituents of the material. In a preferred form of the invention a main inlet for the powdery or granular material is provided in the side wall of the container adjacent its bottom while a liquid inlet is arranged in the wall above and adjacent the main inlet. One or more additional inlets may be provided for the introduction of air and/or foaming agents, the latter preferably being arranged above those already mentioned. In the manufacture of low-density salt, however, sufficient air will usually be introduced at the main inlet, with the salt crystals, to make the provision of an additional air inlet unnecessary.

It will be understood that the location of the various inlets may be varied; the main inlet and liquid inlet could be at the same level in the container wall, or even in its base. However, it is generally preferable that these inlets should be adjacent one another so that the constituents of the material will be admixed as soon as possible after introduction so as to encourage early foaming and thus relieve the pressure on the base of the container.

Figure 4:
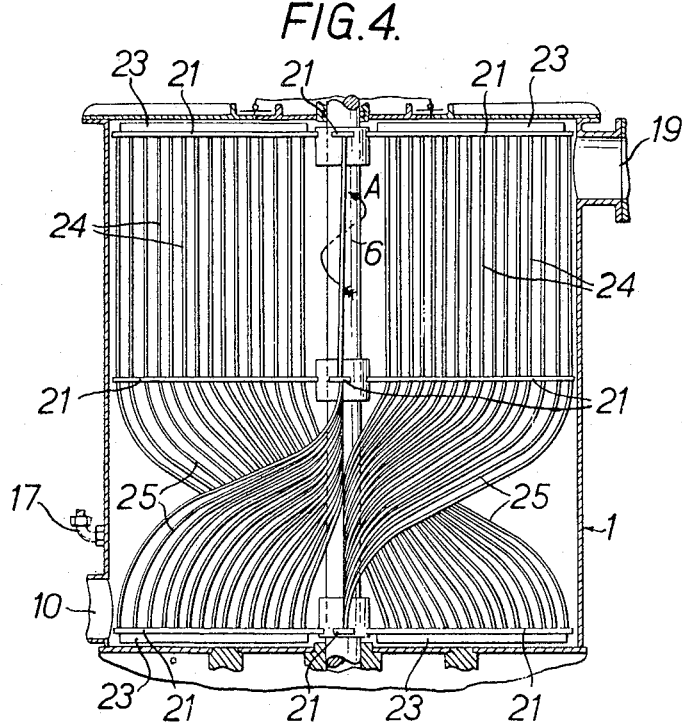

In order that the invention may be more readily understood one embodiment of the same, together with a modification thereof, will now be described by way of example and with reference to the accompanying drawings, in which:

FIG. 1 is a vertical axial cross-section of the apparatus;
FIG. 2 is a horizontal cross-section on the line II—II of FIG. 1;
FIG. 3 is an elevation looking from the right-hand side of the apparatus as seen in FIG. 1; and
FIG. 4 is a vertical medial cross-section of the container in a modified form of the apparatus.

Referring first to FIGS. 1 to 3, the whipping apparatus comprises a cylindrical container 1 mounted in a rigid supporting framework comprising side pillars 2 and upper and lower cross-pieces 3 and 4 respectively. The supporting framework is of heavy construction so as effectively to stabilise the container against the large forces which will be set up within it during operation.

The lower cross-piece 4 carries a taper roller bearing 5 which supports the lower end of a vertical drive shaft 6 of the apparatus, which shaft extends coaxially through the container via a packing gland 7 and is driven in rotation by a motor 8 mounted on the upper cross-piece 3, through a centrifugal or flexible coupling 9 mounted within the cross-piece.

The illustrated apparatus is particularly intended for use in the manufacture of low-density salt and has a main inlet 10 for the salt, to which the latter is led through a duct 11 housing a worm drive 12 driven by a motor 13 through belts 14. Salt is gravity fed to the duct 11 from a hopper 15 via a control valve 16; the hopper may have one or more further outlets for supplying salt simultaneously to one or more further whipping apparatuses.

A second inlet 17 for the introduction of liquid, such as brine solution, is arranged in the container wall immediately above the main inlet 10, and four air inlets 18 are spaced around the container at substantially the same level as the main inlet.

An oblong outlet opening 19 is provided adjacent the top of the container, diametrically opposite the main inlet 10, for the discharge of the foamed material, and is furnished with a discharge duct 20 (removed in FIG. 3). A control valve may be provided in the outlet.

Within the container 1, the drive shaft 6 carries four whipping devices each comprising three vertically spaced radial support arms 21 and a number of whipping members in the form of bars 22. The shaft 6 thus carries three vertically spaced sets of support arms 21, the four support arms of each set lying in the same horizontal plane and being arranged at 90° to each other as is clear from FIG. 2. The respective sets of support arms are, however, offset from one another slightly in the sense of rotation about the shaft 6, so that the whipping bars which they carry lie at an angle of approximately 1° to planes containing the axis of the shaft, with the result that rotation of the shaft and whipping devices in the sense indicated by the arrow A has the effect of urging the material in the container upwardly.

The upper and lower support arms 21 carry scraper blades 23 arranged to clear the interior surfaces of the top and bottom of the container as the whipping devices rotate, and prevent material from caking thereon. The scrapers are preferably bevelled at their leading edges to enhance their efficiency. Further scrapers may be mounted at the outer edges of the whipping devices to clear the wall of the container, if desired.

FIG. 4 shows the container of the modification of the apparatus described above, in which the whipping devices are formed to impart a strong initial lift to material fed into the container. Parts other than the whipping devices, as well as the apparatus outside the container which is not shown, are exactly similar to the previous embodiment and, where illustrated, are given the same reference numerals. Thus, while the whipping bars 24 between the upper and medial support arms 21 are arranged as in the previous embodiment, i.e. with a 1° cant, the bars 25 between the lower and medial support arms are connected between pairs of arms offset from one another by 90° rather than vertically spaced pairs. As a result, although the upper and lower end portions of the bars are still substantially vertical, their central portions have an approximately helical curvature in a direction such as to impart a strong lift to the material in the container upon rotation of the whipping devices in the direction of the arrow A.

If the material to be whipped is one which foams easily, the speed of operation may of course be increased by arranging the upper parts of the whipping devices similarly to the lower parts in FIG. 4. We have found, however, that such an arrangement is not desirable in operation on salt as incomplete foaming may result.

Although, in the embodiments described above, four symmetrically arranged whipping devices are provided, the number of whipping devices may of course be varied. It is, however, preferred that more than one device should be employed and that the devices should be arranged to balance each other about the drive shaft, so as to prevent undue stresses and vibrations.

It will thus be seen that the invention provides an efficient method and apparatus for whipping and foaming various materials. We have found that salt having a density of 30 lbs./ft.$^3$ may be produced by the apparatus, this being approximately 60% of the density of normal salt.

I claim:

1. Apparatus for whipping a material into a foam, comprising: an upright substantially cylindrical container having a side wall and top and bottom walls and having an inlet adjacent its bottom wall for the introduction of materials to be whipped, an outlet adjacent its top wall for the egress of foamed material; and rotary whipping means mounted within the container for rotation about the axis thereof, said whipping means being arranged to cut through the material without imparting any substantial rotary motion thereto and comprising elements defining a generally radial surface, a portion of which extends generally downwardly and forwardly of the direction of rotation to urge said material upwardly in said container, said whipping means extending from said axis substantially to the side wall of said container and substantially from said top wall to said bottom wall thereof whereby to sweep substantially the whole interior of said container.

2. Apparatus as defined in claim 1 wherein said whipping means includes scraping devices arranged to scrape material from said top and bottom walls.

3. Apparatus as defined in claim 1 wherein said whipping means includes four portions, equally angularly spaced about said axis and each extending generally radially thereof.

4. Apparatus as defined in claim 1 wherein said whipping means comprises a plurality of radially spaced elongated thin elements extending generally in the direction of said axis.

5. Apparatus as defined in claim 1 wherein said portion defines a surface of helical configuration about said axis.

6. Apparatus as defined in claim 1 wherein said portion is only the lower part of said whipping means.

7. Apparatus as defined in claim 1 wherein said inlet comprises a main port in said side wall adjacent said bottom wall, for one constituent of said material and a further port in said side wall adjacent to but above said main port, for another constituent of said material.

References Cited by the Examiner

UNITED STATES PATENTS

| | | | |
|---|---|---|---|
| 2,998,963 | 9/1961 | Rinderle | 259—11 |
| 3,023,175 | 2/1962 | Rodman | 259—8 |
| 3,155,542 | 11/1964 | Cordell et al. | 259—8 |

WALTER A. SCHEEL, *Primary Examiner.*

R. W. JENKINS, *Assistant Examiner.*